US012640550B2

(12) United States Patent
Casto

(10) Patent No.: US 12,640,550 B2
(45) Date of Patent: May 26, 2026

(54) CABLE GLAND ASSEMBLY

(71) Applicant: AmpThink, LLC, Garland, TX (US)

(72) Inventor: Dion Joe Casto, Nevada, TX (US)

(73) Assignee: AmpThink, LLC, Garland, TX (US)

( * ) Notice: Subject to any disclaimer, the term of this patent is extended or adjusted under 35 U.S.C. 154(b) by 167 days.

(21) Appl. No.: 18/334,095

(22) Filed: Jun. 13, 2023

(65) Prior Publication Data

US 2024/0421581 A1 Dec. 19, 2024

(51) Int. Cl.
*H02G 15/013* (2006.01)
(52) U.S. Cl.
CPC ................................. *H02G 15/013* (2013.01)
(58) Field of Classification Search
None
See application file for complete search history.

(56) References Cited

U.S. PATENT DOCUMENTS

| | | | | | |
|---|---|---|---|---|---|
| 2,996,567 A | * | 8/1961 | Channell | .............. | H02G 15/013 |
| | | | | | 174/91 |
| 3,889,909 A | * | 6/1975 | Koscik | ..................... | H02G 3/22 |
| | | | | | 439/471 |
| 5,155,303 A | * | 10/1992 | Bensel, III | ........... | G02B 6/4471 |
| | | | | | 174/92 |
| 5,313,546 A | * | 5/1994 | Toffetti | .............. | G02B 6/44465 |
| | | | | | 385/94 |
| 5,736,677 A | * | 4/1998 | Sato | ......................... | H02G 3/22 |
| | | | | | 174/152 G |

| | | | | | |
|---|---|---|---|---|---|
| 6,039,324 A | * | 3/2000 | Santa, Jr. | ............. | H02G 15/013 |
| | | | | | 277/606 |
| 6,118,076 A | * | 9/2000 | Damm | ................. | H02G 15/113 |
| | | | | | 174/92 |
| 6,180,883 B1 | * | 1/2001 | Copeland | ............. | H05K 5/0073 |
| | | | | | 174/152 G |
| 6,215,065 B1 | * | 4/2001 | Cox | ......................... | H02G 3/22 |
| | | | | | 174/656 |
| 6,348,657 B1 | * | 2/2002 | Haslock | ................. | H02G 3/088 |
| | | | | | 174/152 G |
| 7,582,836 B2 | * | 9/2009 | Tapper | ................... | H02G 3/083 |
| | | | | | 174/152 G |
| 8,707,515 B2 | * | 4/2014 | Payne | ................ | G02B 6/44775 |
| | | | | | 16/2.5 |
| 8,735,744 B2 | * | 5/2014 | Schwartz | ............. | H02G 15/013 |
| | | | | | 439/578 |
| 8,807,601 B2 | * | 8/2014 | Anderson | ............. | F16B 43/004 |
| | | | | | 285/344 |
| 9,046,194 B2 | * | 6/2015 | Gandolfo | ................. | H02G 3/22 |
| 9,312,672 B2 | * | 4/2016 | Hill | ......................... | H02G 3/083 |
| 9,431,815 B1 | * | 8/2016 | Findley | ................ | H02G 3/0641 |

(Continued)

FOREIGN PATENT DOCUMENTS

| | | | | | |
|---|---|---|---|---|---|
| CN | 201851016 U | * | 6/2011 | | |
| CN | 108666947 A | * | 10/2018 | ......... | B60R 16/0222 |

(Continued)

*Primary Examiner* — Timothy J. Dole
*Assistant Examiner* — Muhammed Azam
(74) *Attorney, Agent, or Firm* — AmpThink, LLC; James R. Banowsky

(57) ABSTRACT

A cable gland assembly is disclosed that provides an environmental seal around one or more electronic cables that pass through the cable gland assembly and provides deflection-resistant properties that prevent deflection of the one or more electronic cables.

14 Claims, 6 Drawing Sheets

Side View

(56)                References Cited

U.S. PATENT DOCUMENTS

| | | | | |
|---|---|---|---|---|
| 10,131,295 B2 * | 11/2018 | Baydoun | .................. | H02G 1/06 |
| 11,498,692 B2 * | 11/2022 | Tian | ........................ | B29C 65/48 |
| 11,600,976 B2 | 3/2023 | Gibson et al. | | |
| 2017/0305366 A1 * | 10/2017 | Ujita | .................. | B60R 16/0222 |
| 2023/0069558 A1 | 3/2023 | Lonergan | | |

FOREIGN PATENT DOCUMENTS

| | | | | | |
|---|---|---|---|---|---|
| CZ | 226796 A3 * | 4/1997 | | | |
| DE | 202008002915 U1 * | 6/2008 | ................ | F16L 5/06 |
| DE | 102007017918 B4 * | 1/2009 | ................ | F16L 5/06 |
| DE | 102008046658 A1 * | 3/2010 | ................ | F16L 5/10 |
| DE | 212012000102 U1 * | 2/2014 | ........... | G02B 6/4471 |
| DE | 102013207478 A1 * | 10/2014 | ........ | H01R 13/5205 |
| DE | 102013007909 A1 * | 11/2014 | ............ | H02G 3/083 |
| EP | 0808008 A1 * | 11/1997 | | |
| EP | 0695900 B1 * | 7/1998 | | |
| EP | 0942507 A1 * | 9/1999 | | |
| EP | 2044665 B1 * | 12/2013 | ........... | B01D 53/268 |
| EP | 2863506 A2 * | 4/2015 | ................ | F16L 5/02 |
| EP | 3128353 A1 * | 2/2017 | | |
| EP | 3709461 A1 * | 9/2020 | ........... | H02G 15/013 |
| GB | 2058988 A * | 4/1981 | ........... | H01B 17/308 |
| KR | 20110077822 A * | 7/2011 | | |
| KR | 20120080784 A * | 7/2012 | | |
| NO | 840840 L * | 11/1984 | | |
| TW | 583804 B * | 4/2004 | | |
| WO | WO-2006069900 A1 * | 7/2006 | ........... | H01B 17/308 |

* cited by examiner

Front View

Side View

Rear View

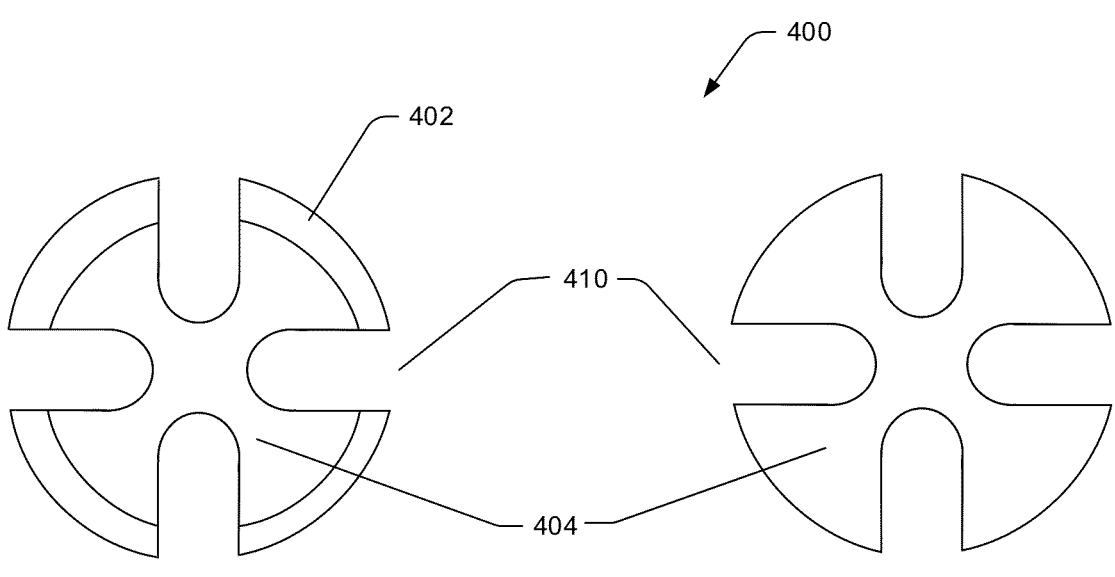
Fig. 4a
Front View
Fig. 4b
Rear View
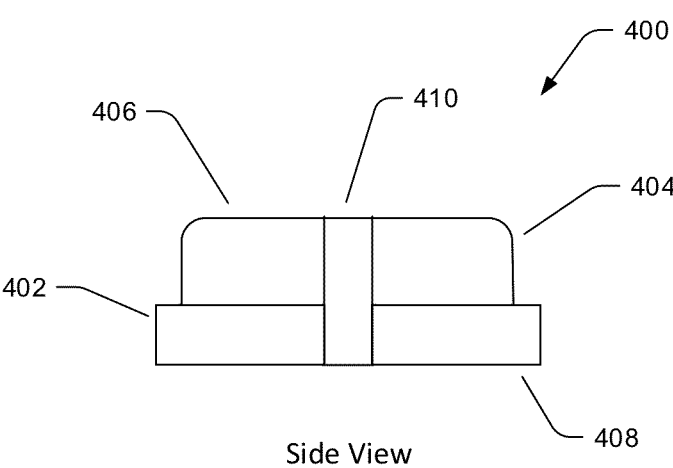
Side View
Fig. 4c

CABLE GLAND ASSEMBLY

BACKGROUND

A cable gland (also known as a cord grip, cable connector, or cable fitting) is a device designed to secure the end of one or more electrical cables to a piece of equipment. Cable glands are also be used for sealing cables passing through bulkheads, gland plates, or equipment enclosures. A cable gland helps to seal an opening for passage of one or more cables to prevent environmental elements, e.g. moisture, dust, insects, etc., from traversing the opening. However, a significant drawback to present cable glands is that when one of the one or more cables is deflected near an opening sealed with a cable gland, the cable gland can be sufficiently deformed to allow environmental elements to pass through the opening.

SUMMARY

A cable gland assembly is disclosed herein that prevents a deflection of a cable passing through a cable gland from deforming a seal provided by the cable gland. As such, the presently described invention provides for an improved seal of a cable opening when one or more cables passes through the opening. The cable gland assembly includes a novel strain relief cable grommet positioned between a potential point of cable deflection and a gasket, or seal, disposed around one or more cables.

BRIEF DESCRIPTION OF THE DRAWINGS

A particular description of the principles briefly described above will be rendered by reference to specific embodiments thereof, which are illustrated in the appended drawings. Understanding that these drawings depict only certain exemplary embodiments of the disclosure and are not therefore to be considered to limit its scope, the principles herein are described and explained with additional specificity and detail through the use of the accompanying drawings.

FIG. 4a depicts a front elevation view of a strain relief cable grommet for use in a cable gland assembly as described herein.

FIG. 4b depicts a rear elevation view of a strain relief cable grommet for use in a cable gland assembly as described herein.

FIG. 4c depicts a side elevation view of a strain relief cable grommet for use in a cable gland assembly as described herein.

DETAILED DESCRIPTION

The apparatuses and techniques describe herein relate to a cable gland. In particular, an improved cable gland assembly is described. Although cable glands and cable gland assemblies are used in a variety of applications and environments, the present discussion will focus on use of the described cable gland assembly in a wireless network that includes weather-resistant enclosures that house electronic components that are connected by electronic cables. A cable gland assembly as disclosed herein is disposed with an enclosure to seal an opening in the enclosure that allows one or more cables to traverse a wall of the enclosure. The description below refers to a particular arrangement of four electronic cables passing into an electronic component enclosure. However, those skilled in the art will recognize that the described technology can be applied to a single electronic cable or practically any number of electronic cables.

Figure 1:
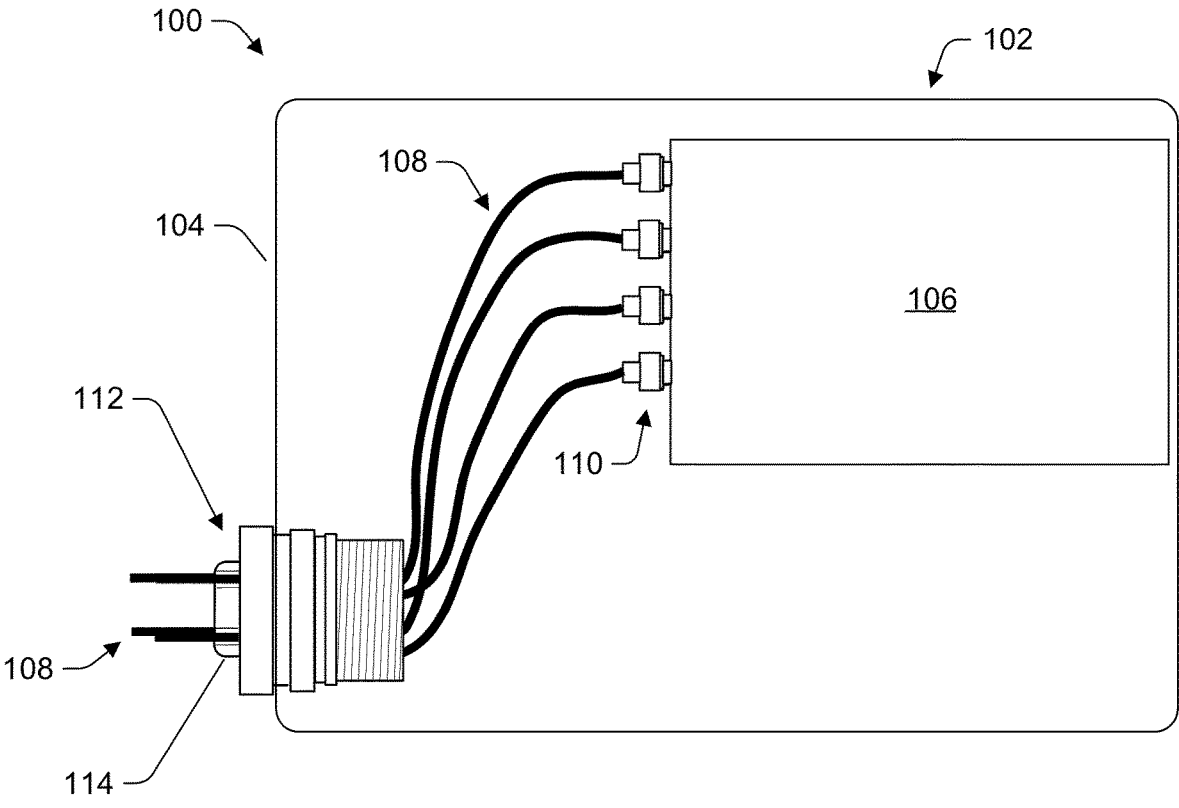
FIG. 1 is a depiction of an example enclosure in which a cable gland assembly is utilized.

FIG. 1 is a depiction of an example enclosure 100. The enclosure includes an enclosure body 102 having at least one enclosure wall 104 and an enclosure lid (not shown so as to reveal contents of the enclosure body 102). A Wi-Fi antenna 106 is mounted within the enclosure body 102. It is noted that although an antenna 106 is shown in this particular example, any type of electronic component may be housed in the enclosure 100. Multiple electronic cables 108 are connected to the Wi-Fi antenna 106, and each of the multiple electronic cables 108 is connected to the Wi-Fi antenna 106 by way of a cable connector 110. It is noted that use of a cable gland assembly as described herein allows the cable gland assembly to be used with pre-terminated electronic cables, such as those shown in FIG. 1, wherein the cable connectors 110 are connected to the electronic cables 108 prior to being installed with the Wi-Fi antenna 106 and the enclosure 100. Details of such a feature are described in greater detail below.

A cable gland assembly 112 is disposed so as to traverse the enclosure wall 104 and thus facilitate passage of the electronic cables 108 from inside the enclosure body 102 to outside the enclosure body 102. As will be described in greater detail below, the cable gland assembly 112 provides an environmental seal for the enclosure 100. A strain relief cable grommet 114 that is part of the cable gland assembly 112 prevents deflection of the electronic cables 108 from degrading the environmental seal formed by the cable gland assembly 112.

Figure 2:
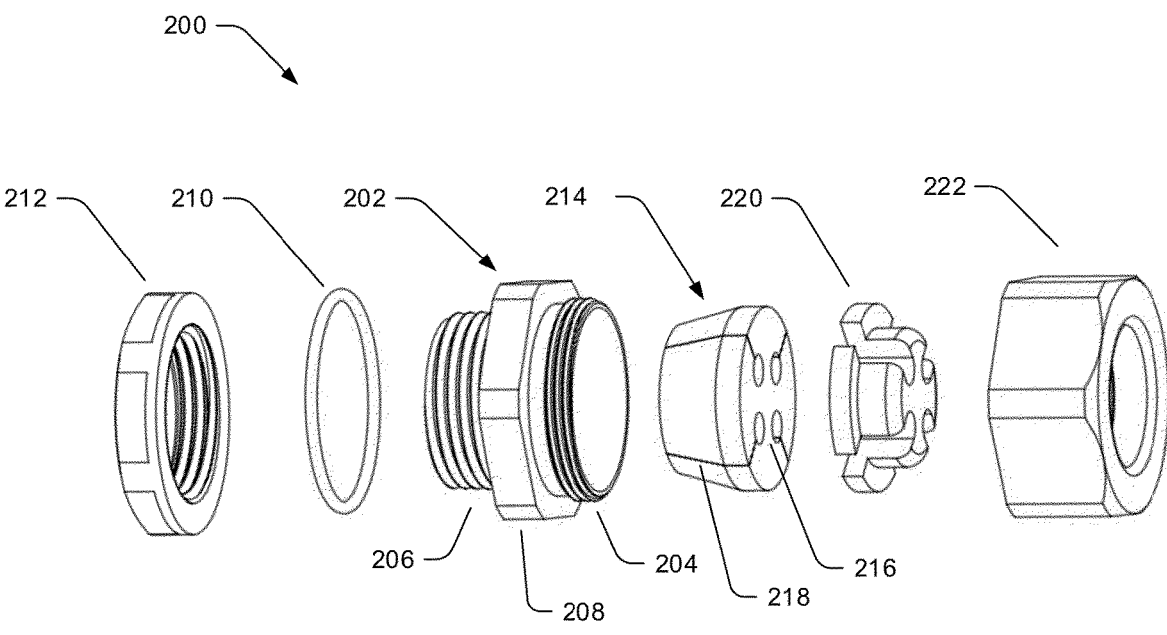
FIG. 2 is an exploded diagram of an example cable gland assembly in accordance with the present description.

FIG. 2 is an exploded diagram of an example cable gland assembly 200 in accordance with the present description. In the following description of FIG. 2, continuing reference is made to elements and reference numerals shown in and described with respect to FIG. 1. The cable gland assembly 200 includes a gland housing 202 having outer threads 204 and inner threads 206. When installed in an enclosure wall 104 (FIG. 1) the inner threads 206 are disposed inside an enclosure 100 (FIG. 1) and the outer threads 204 are disposed outside the enclosure 100. A gland housing locknut 208 is disposed between the inner threads 206 and the outer threads 204 of the gland housing 202. In a typical installation, the inner threads 206 are installed through the enclosure wall 104 such that the gland housing locknut 208 is positioned against the enclosure wall 104 on the outside of the enclosure 100. An O-ring 210 is disposed over the inner threads 206 and positioned against an opposite side of the enclosure wall 104 from the gland housing locknut 208. A locknut 212 is disposed over the inner threads 206 and can be tightened to secure the cable gland assembly 200 to the enclosure wall 104.

The cable gland assembly 200 also includes a compression gasket 214 that is tapered to allow it to fit inside the outer threads 206 of the gland housing 202 and provide a pressure seal between the compression gasket 214 and the gland housing 202. The compression gasket 214 includes multiple cable pathways 216, one for each electronic cable 108 (FIG. 1) that will pass through the cable gland assembly 200. Each cable pathway 216 has a cable access slit 218 associated therewith that extends from the cable pathway 216 to an outer edge of the compression gasket 214. The compression gasket 214 is shown and described in more detail with reference to FIG. 3, below.

A strain relief cable grommet 220 is included in the cable gland assembly 200 and is disposed adjacent to the compression gasket 214. The strain relief cable grommet 220 is made of a material significantly rigid to prevent deflection when an electronic cable passing through the strain relief cable grommet 220 is deflected. The strain relief cable grommet 220 is shown in and described in greater detail below, with respect to FIG. 4. The cable gland assembly 200 further includes a compression nut 222 which is configured to be disposed over the strain relief cable grommet 220 and compression gasket 214, and is securable to the outer threads 206 in a manner such that the compression gasket 214, which is made from a deformable material, conforms to the shape of the inside of the gland housing 202 and the electronic cables 108 (FIG. 1) to provide an environmental seal.

Figure 3A:
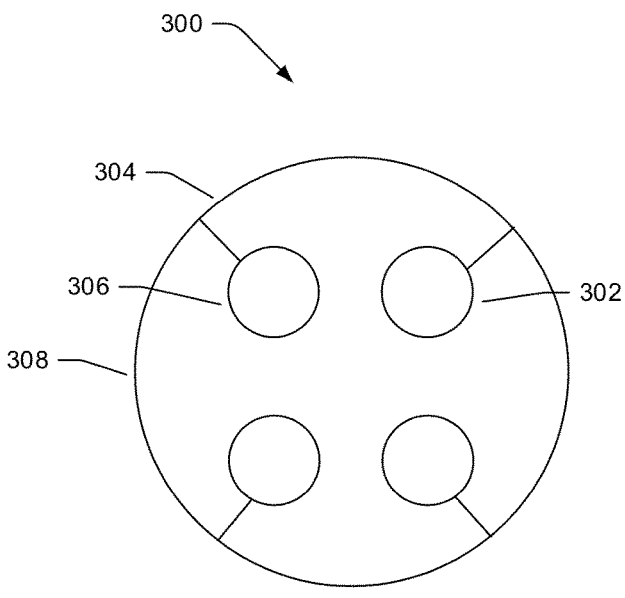
FIG. 3a depicts a front elevation view of a compression seal for use in a cable gland assembly as described herein.
Figure 3B:
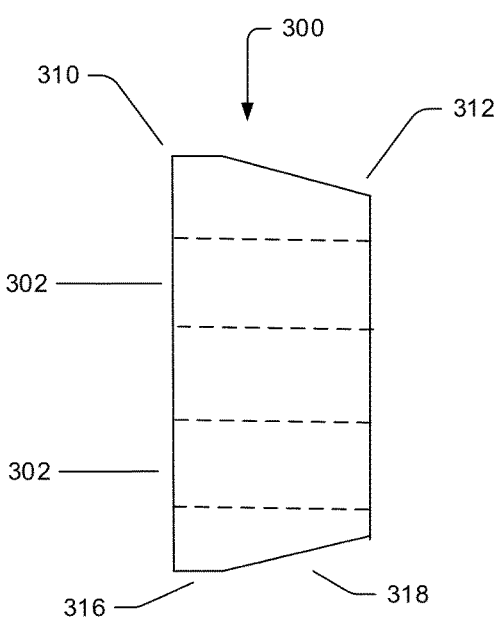
FIG. 3b depicts a side elevation view of a compression seal for use in a cable gland assembly as described herein.
Figure 3C:
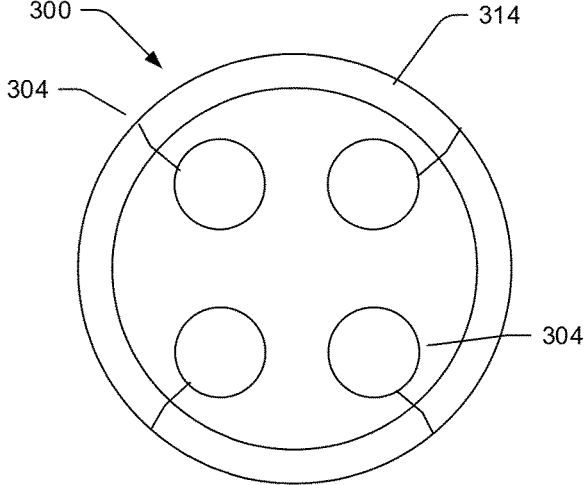
FIG. 3c depicts a rear elevation view of a compression seal for use in a cable gland assembly as described herein.

FIGS. 3a, 3b, and 3c depict various elevation views of an example compression gasket 300 for use in a cable gland assembly 200 (FIG. 2) as described herein. In the following discussion of FIG. 3 (a, b, c), continuing reference is made to elements and reference numerals of previous figures.

FIG. 3a is front elevation view of the example compression gasket 300, which is similar to the compression gasket 214 shown in FIG. 2. The compression gasket 300 is constructed from a deformable material, such as silicone, etc. A deformable characteristic of the compression gasket 300 allows the compression gasket 300 to deform to the shape of the outer threads 2064 (FIG. 2) of the gland housing 202 (FIG. 2) and thus form an environmental seal between the compression gasket 300 and the gland housing 202.

The deformability of the compression gasket 300 also allows the compression gasket 300 to form an environmental seal around each of the electronic cables 108 (FIG. 1). The example compression gasket 300 includes a cable pathway 302 for each electronic cable (not shown) to pass through the compression gasket 300. Each cable pathway 302 is associated with a cable access slit 304 that allows an electronic cable (not shown) to be placed into a cable pathway 302 even if the electronic cable has a connector attached to one or both ends of the electronic cable. Each cable access slit 304 extends from a cable pathway perimeter 306 to a compression gasket perimeter 308 and from a front side 310 of the compression gasket 300 (FIG. 3b) to a rear side 312 (FIG. 3b) of the compression gasket 300. In this particular embodiment, the compression gasket 300 further comprises an annulus 314 (FIG. 3c) that is formed between the front side 310 and the rear side 312 of the compression gasket 300. The annulus 314 provides a transition between a flat surface 316 (FIG. 3b) near the front side 310 of the compression gasket 300 to a tapered portion 318 (FIG. 3b) of the compression gasket 300.

FIGS. 4a, 4b, and 4c depict front, rear, and side elevation views, respectfully, of an example strain relief cable grommet 400 for use in a cable gland assembly such as the cable gland assembly 200 (FIG. 2) previously shown and described. In the following discussion of FIG. 4 (a, b, c), continuing reference is made to elements and reference numerals of previous figures.

The example strain relief grommet 400 includes a base section 402 and a body section 404. the strain relief grommet 400 is constructed of a semi-rigid or rigid material such as a metal or a polymer. The strain relief grommet 400 must be sufficiently rigid to prevent deflection of cables and to provide compression means for the cable gland assembly 200 (FIG. 2). A radius of the base section 402 extends beyond a radius of the body section 404 to provide a platform for the compression nut 222 (FIG. 2) to apply pressure to the strain relief grommet 400 and compress the compression gasket 214 (FIG. 2), thus forming a proper environmental seal.

The strain relief grommet 400 includes a front 406 and a rear 408. The strain relief grommet 400 further includes one or more cable notches 410, each cable notch 410 extending from the front 406 of the strain relief grommet 400 to the rear 408 of the strain relief grommet 400. In the present example, the strain relief grommet 400 includes four (4) cable notches, but any practical number may be included. Each cable notch 410 approximates a diameter of an electric cable (not shown) that will be used therewith so as to provide an adequate seal within the cable gland assembly 200.

Figure 5:
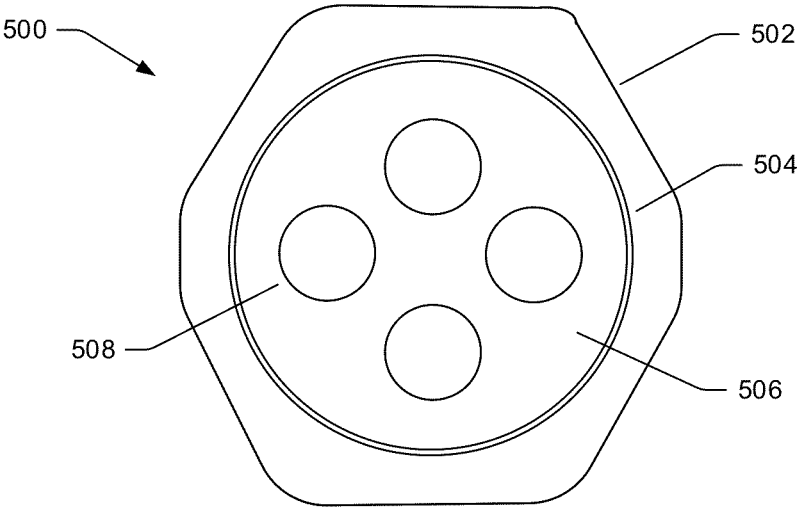
FIG. 5 depicts a portion of a cable gland assembly as described herein showing components of the cable gland assembly that contribute to providing an environmental seal.

FIG. 5 depicts a portion of a cable gland assembly 500 as described herein showing components of the cable gland assembly 500 that contribute to formation of an environmental seal when the cable gland assembly 500 is assembled. The cable gland assembly 500 is similar to the cable gland assembly 200 shown in FIG. 2. In the following discussion, continuing reference is made to elements shown and described in relation to previous figures.

The cable gland assembly 500 depicted includes a gland housing 502, outer threads 504, and a compression gasket 506 that includes multiple cable pathways 508. The compression gasket 506 is disposed within the outer threads 504 of the gland housing 502. The tapered portion 318 (FIG. 3) of the compression gasket 506 forms a seal with an inner side of the outer threads 504 the gland housing 502. When the compression gasket 506 is seated, the outer threads 504 are exposed to allow connection of a compression nut (not shown) to apply pressure to the compression gasket 506 and enhance the seal.

Figure 6:
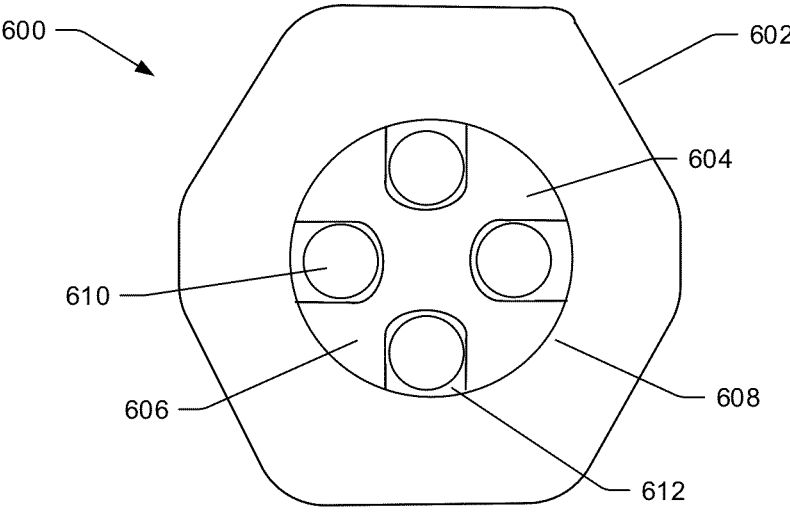
FIG. 6 depicts a gland housing and compression gasket used in a cable gland assembly as described herein.

FIG. 6 depicts a view of a cable gland assembly 600 that is similar to the cable gland assembly 200 shown in and described with respect to FIG. 2. In the following discussion, continuing reference is made to elements shown and described in relation to previous figures.

The cable gland assembly 600 includes a compression nut 602 disposed over a strain relief cable grommet 604 and a compression gasket 606. The compression nut 602 includes an inner perimeter 608. The strain relief cable grommet 604 includes multiple cable notches 610 that allow for passage of electronic cables (not shown). The compression gasket 606 includes multiple cable pathways 612 through which electronic cables (not shown) can pass. When assembled, the cable notches 610 in the strain relief cable grommet 604 are aligned with the cable pathways 612 in the compression gasket 606 so that each of multiple electronic cables (not shown) can pass from one side of the cable gland assembly 600 to an opposite side of the cable gland assembly 600.

There is a one-to-one correspondence between a number of cable notches 610 and cable pathways 612. In at least one alternate implementation, the cable gland assembly 600 may be configured to receive a single electronic cable (not shown). In such an implementation, there will be only a single cable notch 610 and a single cable pathway 612.

The compression nut 602 includes threads (not shown) that are connectable to the outer threads 504 (FIG. 5) of the gland housing 502 (FIG. 5). As the threads of the compression nut 602 are tightened to the outer threads 504, the compression nut 602 applies pressure to the base section 402 (FIG. 4) of the strain relief cable grommet 400 (FIG. 4) to provide a seal between the compression gasket 606 and the strain relief cable grommet 604, and also between the inner perimeter 608 of the compression nut 602 and an electronic cable (not shown) that extends out of the cable notch 610 when implemented.

Figure 7:
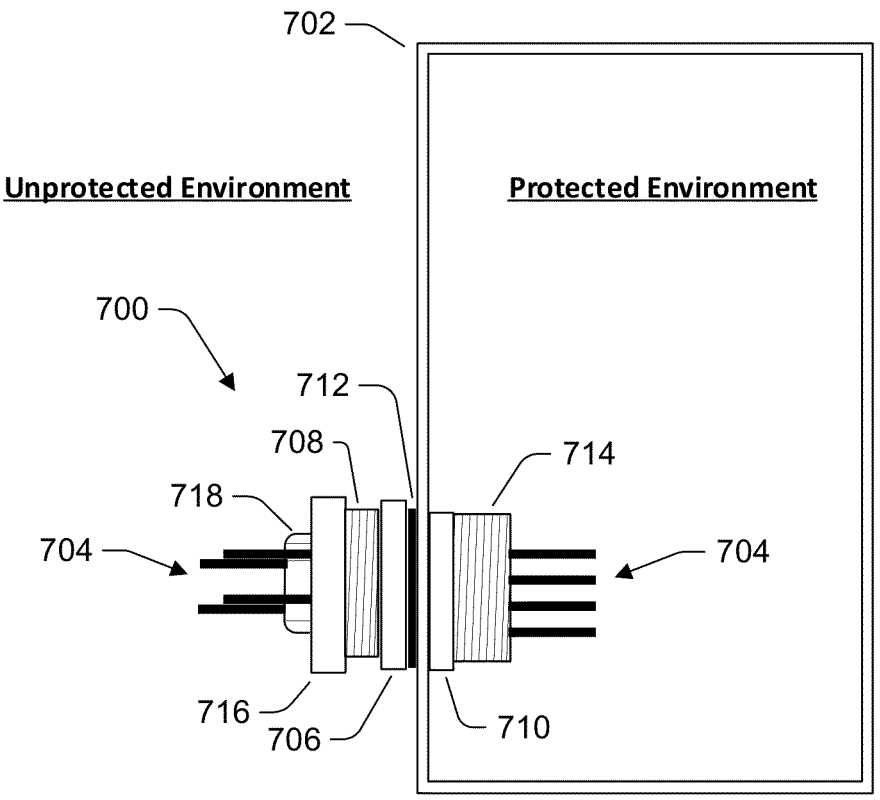
FIG. 7 depicts a portion of a cable gland assembly as described herein showing a manner in which cables pass through the cable gland assembly.

The depiction shown in FIG. 7 represents the cable gland assembly 500 shown in FIG. 5 after addition of the gland housing and compression gasket used in a cable gland assembly as described herein.

FIG. 6 depicts an end view of a cable gland assembly 600 similar to the cable gland assembly 200 shown in FIG. 2 and showing a manner in which electronic cables pass through the cable gland assembly 600. In the following discussion, continuing reference is made to elements shown and described in relation to previous figures.

The cable gland assembly 600 includes a compression nut 602 that is securable to inner threads 204 (FIG. 2). When the compression nut 602 (see also compression nut 222 (FIG. 2) is secured to the inner threads 204 of the gland housing 202 (FIG. 2), the compression nut 602 applies pressure to a strain relief cable grommet 604 disposed under the compression nut 602 and on top of a compression gasket 606. Cable notches 608 in the strain relief cable grommet 604 are aligned with cable pathways 610 in the compression gasket 606 such that an electronic cable (not shown) may pass through the cable gasket 606 and the strain relief cable grommet 604 when in use. The cable pathways 610 approximate a diameter of an electronic cable (not shown) to be used with the cable gland assembly 600.

As the compression nut 602 is tightened to the inner threads 204, the force therefrom forces an inner perimeter 612 of the compression nut 602 against an electronic cable (not shown) extending from the cable gland assembly 600 to provide an environmental seal. Electronic cables are typically enclosed in a deformable material such as plastic or rubber, which allows the inner perimeter 612 to form a seal when it is forced against the electronic cable.

FIG. 7 depicts an example cable gland assembly 700 similar to the cable gland assembly 200 shown in FIG. 2 and showing the cable gland assembly 700 disposed in a functional situation. In the following discussion, continuing reference is made to elements shown and described in relation to previous figures.

The example cable gland assembly 700 is disposed in an enclosure wall 702 that separates an unprotected environment from a protected environment. The cable gland assembly 700 provides a passageway for multiple electronic cables 704 to transit the enclosure wall 702 while providing an environmental seal for the protected environment.

The example cable gland assembly 700 includes a gland housing 706 and gland housing outer threads 708 that are disposed on the unprotected environment side of the wall 702 when the cable gland assembly 700 is in place. A compression nut 716 is disposed over the gland housing outer threads 708 and is secured, in the present example, by screwing the compression nut 716 onto the gland housing outer threads 708. A strain relief cable grommet 716 is secured in place by the compression nut 716 as previously described. The gland housing 706 further includes gland housing inner threads 714 over which a gland housing locknut 712 is disposed and secured, in the present example, by screwing the gland housing locknut 710 onto the gland housing inner threads 714. An O-ring 712 is disposed over the gland housing inner threads 714 and between the gland housing locknut 710 and the enclosure wall 702 to provide a more secure environmental seal between the gland housing locknut 710 and the enclosure wall 702.

The electronic cables 704 pass through the strain relief cable grommet 718 and a compression seal (not shown) to the protected environment, where they can connect with an electronic device (not shown) disposed within the protected environment. When such an enclosure is installed, it is not unusual for the electronic cables 704 to be deflected on an exterior of the enclosure, which compromises the environmental seal provided by the cable gland assembly 700. In the present example, such deflection will be limited by the strain relief cable grommet 718, which improves an environmental seal between the compression gasket 214 (FIG. 2), the strain relief cable grommet 718, the electronic cables 704, and the compression nut 716 (in particular, the inner perimeter 604 (FIG. 6) of the compression nut 716.

While the cable gland assembly is described with respect to certain embodiments and/or generally associated methods, alterations and permutations of these embodiments and application to any use, a person having ordinary skill in the art will recognize other applications in which the presently described technology may be used. Accordingly, the above description of example embodiments does not define or constrain this disclosure. Other changes, substitutions, and alterations are also possible without departing from the spirit and scope of this disclosure, as defined by the following claims.

The invention claimed is:

1. A cable gland assembly, comprising:
   a gland housing having a first side, a second side, and a space therethrough extending from and through the first side to and through the second side;
   a compression gasket removably disposed in the second side of the cable gland housing, the compression gasket having one or more cable pathways extending therethrough and having a tapered portion between a front side and a rear side;
   a strain relief cable grommet proximally disposed to the compression gasket and having one or more cable notches, an amount of cable notches matching an amount of cable pathways in the compression gasket; and
   compression means to apply a compressive force to the strain relief cable grommet, the compression gasket, and the gland housing to secure the strain relief cable grommet and the compression gasket to the gland housing; and
   wherein the compression means further applies pressure to force the tapered portion of the compression gasket into a portion of the gland housing to apply a radial force to the cable pathways extending through the compression gasket.

2. The cable gland assembly as recited in claim 1, wherein the compression gasket further comprises one or more cable access slits, each access slit being associated with a cable pathway and extending from a perimeter of the cable pathway to a perimeter of the compression gasket.

3. The cable gland assembly as recited in claim 1, further comprising securing means to secure the cable gland assembly to an enclosure.

4. The cable gland assembly as recited in claim 3, wherein the compression means further comprises:

inner threads disposed on the first side of the gland housing;

outer threads disposed on the second side of the gland housing; and a compression nut that is disposable over the strain relief cable grommet and the compression gasket and securable to the inner threads.

5. The cable gland assembly as recited in claim 1, wherein the gland housing is substantially a cylinder, and the first side and the second side are located at opposite ends of the cylinder.

6. The cable gland assembly as recited in claim 1, wherein the strain relief cable grommet is composed of a material that does not become deformed when an electronic cable passing through a cable notch is deflected near the cable gland assembly.

7. The cable gland assembly as recited in claim 1, wherein the compression gasket is formed from a material that is deformable such that when compressive force is applied to the compression gasket, the compression gasket is deformed into the shape of the space in which it is disposed.

8. The cable gland assembly as recited in claim 1, wherein each of the cable pathways in the compression gasket are alignable with a respective cable notch in the strain relief cable grommet to form a continuous pathway for an electronic cable through the compression gasket and the strain relief cable grommet.

9. A cable gland assembly, comprising:

a cylindrical housing section;

8 a sealing section further comprising means to form a compression seal around one or more electronic cables, and including a solid compression gasket that has a tapered portion extending from a first side to a second side wherein the tapered portion is insertable into a portion of the cylindrical housing section to apply a radial force to multiple cable pathways extending through the compression gasket;

a cable deflection resistant section disposable adjacent to the sealing section; and wherein the cylindrical housing section, the sealing section, and the cable deflection resistant section releasably communicate to form an anti-deflection environmental seal around one or more electronic cables passing through the multiple cable pathways.

10. The cable gland assembly as recited in claim 9, further comprising securing means to secure the cable gland assembly to an enclosure wall.

11. The cable gland assembly as recited in claim 10, wherein the securing means further provide compression to cable gland assembly components to form the environmental seal around one or more electronic cables passing through the cable gland assembly.

12. The cable gland assembly as recited in claim 9, wherein the cable deflection resistant section further comprises a strain relief cable grommet that includes one or more cable notches extending inward from an outer perimeter of the strain relief cable grommet.

13. The cable gland assembly as recited in claim 12, wherein the strain relief cable grommet is disc shaped.

14. The cable gland assembly as recited in claim 13, wherein the strain relief cable grommet further comprises a body having a first section and a second section, the first section having a greater diameter than the second section.

* * * * *